United States Patent
Ebner

(10) Patent No.: US 6,805,318 B2
(45) Date of Patent: Oct. 19, 2004

(54) DEVICE FOR GUIDING A METAL STRIP ON A GAS CUSHION

(76) Inventor: Peter Ebner, Bergham 168, Leonding (AT), A 4060

( * ) Notice: Subject to any disclaimer, the term of this patent is extended or adjusted under 35 U.S.C. 154(b) by 0 days.

(21) Appl. No.: 10/240,065

(22) PCT Filed: Apr. 25, 2001

(86) PCT No.: PCT/AT01/00124

§ 371 (c)(1),
(2), (4) Date: Sep. 27, 2002

(87) PCT Pub. No.: WO01/86015

PCT Pub. Date: Nov. 15, 2001

(65) Prior Publication Data

US 2003/0146340 A1 Aug. 7, 2003

(30) Foreign Application Priority Data

May 5, 2000 (AT) .......................................... A 790/2000

(51) Int. Cl.[7] .............................................. B65H 23/24
(52) U.S. Cl. ................................................ 242/615.11
(58) Field of Search ...................... 242/615.11; 34/640, 34/643; 226/97.3

(56) References Cited

U.S. PATENT DOCUMENTS

| 3,231,165 A | | 1/1966 | Wallin et al. | |
|---|---|---|---|---|
| 3,918,706 A | * | 11/1975 | Craft | 271/250 |
| 3,957,187 A | * | 5/1976 | Puigrodon | 242/615.11 |
| 4,218,001 A | * | 8/1980 | Vits | 242/615.11 |
| 4,453,709 A | * | 6/1984 | Reba | 34/643 |
| 4,455,136 A | * | 6/1984 | Imose et al. | 34/643 |
| 4,836,429 A | * | 6/1989 | Nakashima et al. | 242/615.11 |
| 5,102,118 A | * | 4/1992 | Vits | 242/615.11 |
| 6,231,001 B1 | * | 5/2001 | Kramer et al. | 242/615.11 |
| 2003/0047642 A1 | * | 3/2003 | Ebner | 242/615.11 |

FOREIGN PATENT DOCUMENTS

| DE | 30 26 132 | 7/1980 |
|---|---|---|
| DE | 298 13 660 | 2/1998 |
| EP | 0 577 043 | 1/1994 |

\* cited by examiner

Primary Examiner—Emmanuel Marcelo
(74) Attorney, Agent, or Firm—Collard & Roe, P.C.

(57) ABSTRACT

An apparatus is described for guiding a metal band (1) on a gas cushion with blowing boxes (4) which are disposed one after the other in the longitudinal direction (3) of the band and whose nozzle fields (5) which extend transversally to the longitudinal direction (3) of the band comprise hole-type nozzles (6) distributed over the field surface area and slotted nozzles (8) along the edges (7) which extend transversally to longitudinal direction (3) of the band. In order to provide advantageous constructional conditions it is proposed that the slotted nozzles (8) along the edges (7) consist of several nozzle slots (9) which are arranged one after the other parallel to the edge and are inclined inwardly with respect to the edge (7) starting from the respective center (10) of the edge.

4 Claims, 2 Drawing Sheets

DEVICE FOR GUIDING A METAL STRIP ON A GAS CUSHION

CROSS REFERENCE TO RELATED APPLICATIONS

Applicant claims priority under 35 U.S.C. §119 of Austrian Application No. A 790/2000 filed May 5, 2000. Applicant also claims priority under 35 U.S.C. §365 of PCT/AT01/00124 filed Apr. 25, 2001. The international application under PCT article 21(2) was not published in English.

BACKGROUND OF THE INVENTION

The invention relates to an apparatus for guiding a metal band on a gas cushion with blowing boxes which are disposed one after the other in the longitudinal direction of the band and whose nozzle fields, which extend transversally to the longitudinal direction of the band, comprise hole-type nozzles distributed over the field surface area and slotted nozzles along the edges which extend transversally to the longitudinal direction of the band.

DESCRIPTION OF THE PRIOR ART

In order to enable the conveyance of a metal band floating on a gas cushion in the longitudinal direction of the band it is known (DE 30 26 132 A) to provide blowing boxes which are disposed one after the other in the longitudinal direction of the band and whose nozzle fields extend transversally to the longitudinal direction of the band and comprise hole-type nozzles which are distributed over the field surface area. The gas flowing through said hole-type nozzles against the metal band form a supporting air cushion which is supported by a gas flow from parallel slotted nozzles which extend transversally to the longitudinal direction of the band and delimit the rectangular field surface forming the hole-type nozzles. Although said slotted nozzles which are parallel to the edge prevent the flowing off of the gas from the hole-type nozzle zone in the longitudinal direction of the band, the flowing off of the gas from the gas cushion transversally to the longitudinal direction of the band cannot be prevented through such slotted nozzles. In order to increase the static pressure of the gas cushion between the nozzle slots delimiting the nozzle field and to thus increase the carrying power it is known (DE 298 13 660 U1) to taper the nozzle fields starting from the longitudinal center towards their longitudinal edges, so that the gas flow will also prevent the flowing off of gas from the gas cushion transversally to the longitudinal direction of the band with the desired effect of an increase in the carrying power. With the nozzle fields which outwardly taper transversally to the longitudinal direction of the band the return flow channels between the blowing boxes expand outwardly, which is linked to a respective reduction in the speed of the gas flow flowing through said return flow channels. This means that the pressure drop dependent on the flow speed decreases in the zone of this gas return flow and therefore the carrying power is increased accordingly. The disadvantageous aspect in the nozzle fields tapering towards the longitudinal edges of the metal band is however that as a result of the thus caused uneven distribution of the hole-type nozzles over the width of the metal band only an even heat treatment of the metal band can thus be achieved through the gas flow.

SUMMARY OF THE INVENTION

The invention is thus based on the object of providing an apparatus for guiding a metal band on a gas cushion of the kind mentioned above in such a way that with an even distribution of the hole-type nozzles over the width of the band to be treated it is possible to enable an increase in the carrying power without having to increase the gas volume.

The invention achieves this object in such a way that the slotted nozzles along the edges consist of several nozzle slots which are arranged one after the other parallel to the edge and are inclined inwardly with respect to the edge starting from the respective center of the edge.

Since as a result of these measures a tapering of the nozzle field towards the longitudinal edges becomes effective in the zone of the individual nozzle slots which are inwardly inclined with respect to the edge, a resistance is established against the free flowing off of the gas from the air cushion zone transversally to the longitudinal direction of the band by said narrowing of the nozzle field, which resistance leads to an increase in the carrying power because the static pressure in the zone of the gas cushion is increased by hindering the flowing off of the gas towards the longitudinal edges of the metal band. An additional factor is that an additional possibility for flowing off in the longitudinal direction of the band is created between the successive nozzle slots, namely in a zone close to the blowing box before the individual flows converge through the nozzle slots into a common flow directed against the metal band. This means that a part of the gas from the gas cushion zone can flow off between the inclined nozzle slots to the return flow channels between the blowing boxes with the effect that the flow speed of the gas flow deflected in the zone of the metal band is reduced and thus the pressure drop in the zone of this gas flow can be kept comparably small in the zone of the metal band, which is accompanied by a support of the carrying power. Despite this additional possibility for the gas to flow off in the longitudinal direction of the band, the supporting effect of the gas flow produced by the nozzle slots on the gas cushion of the nozzle field is maintained because the individual gas flows converge by the longitudinal slots towards the metal band. The inwardly inclined longitudinal slots along the edges of the nozzle fields extending transversally to the longitudinal direction of the band thus produce an advantageous increase in the carrying power as a result of a cooperation of the obstruction of the gas flow-off transversally to the longitudinal direction of the band on the one hand and the support of an additional gas flow-off in the longitudinal direction of the band without having to take into account any reductions concerning an even heat transmission between the gas flow and the metal band.

Since the length and inclination of the nozzle slots have an influence on the flow behavior in and transversally to the longitudinal direction of the band, the nozzle field can be adjusted to different conditions by the choice of this parameter. The nozzle slots starting out from the respective center of the edges of the nozzle fields can extend parallel with respect to one another. In order to create further possibilities for adjustments, the inclination of the nozzle slots can increase with growing distance from the respective center of the edge in order to have an influence that increases towards the longitudinal edges of the metal band on the flow-off behavior of the gas cushion transversally to the longitudinal direction of the band.

To ensure that it is not necessary to take into account any uneven heat treatment of the band via the gas flow by the nozzle slots as a result of an overlapping zone of nozzle slots placed one after the other, directly adjacent nozzle slots of a row of slots can end in the zone of a common straight line extending in the longitudinal direction of the band, so that transversally to the longitudinal direction of the band the adjacent nozzle slots will follow each other directly without any mutual overlapping, but mutually offset in the longitudinal direction of the band.

BRIEF DESCRIPTION OF THE DRAWINGS

The subject matter of the invention is shown in the drawings by way of example, wherein.

DETAILED DESCRIPTION OF THE PREFERRED EMBODIMENTS

Figure 1:
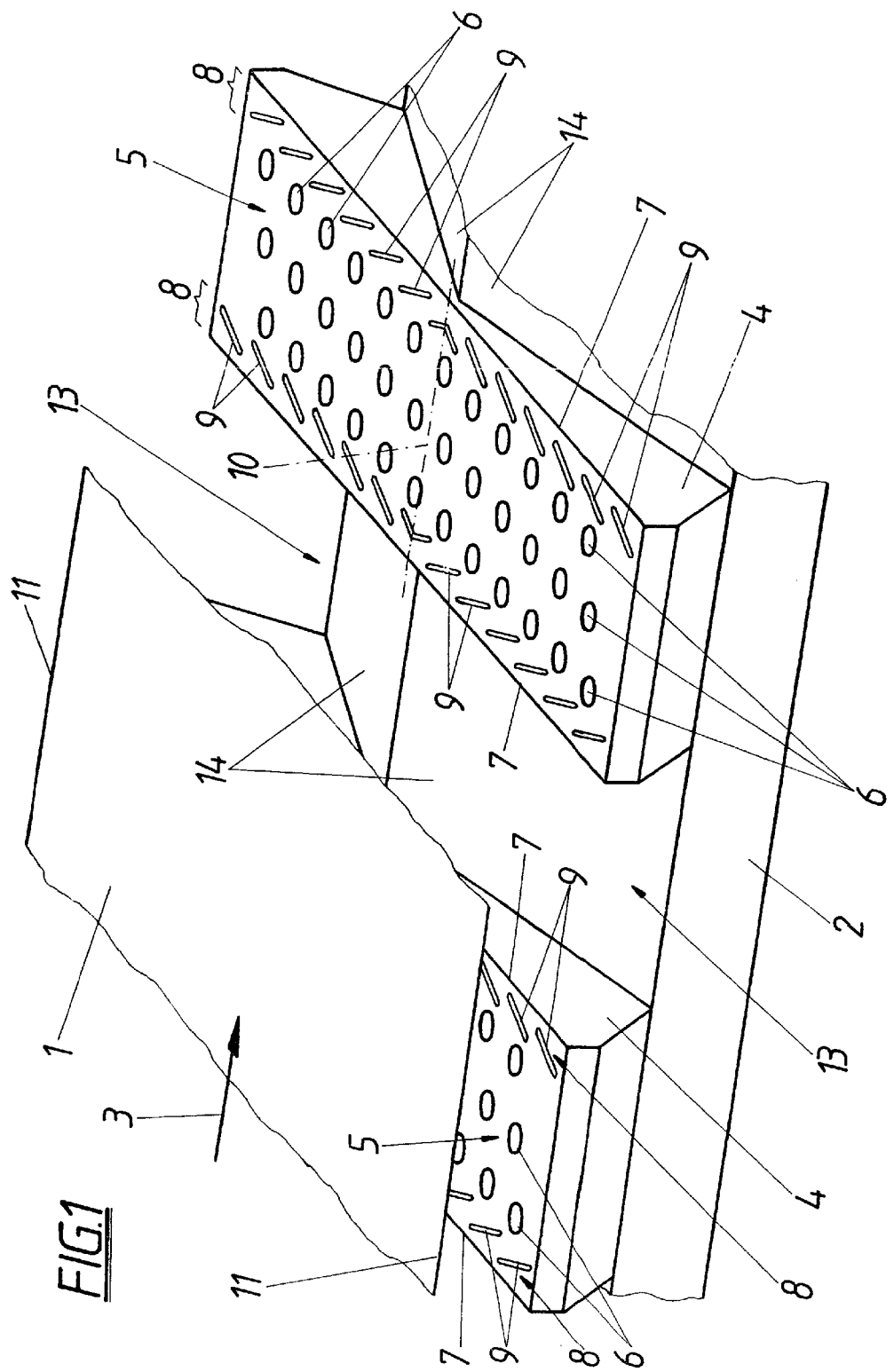
FIG. 1 shows an apparatus in accordance with the invention for guiding a metal band on a gas cushion in a sectional view in a simplified diagram.

According to FIG. 1, the apparatus for guiding a metal band 1 consists of a frame 2 which carries blowing boxes 4 which are situated one after the other in the longitudinal direction 3 of the band and which form the nozzle fields 5. Said nozzle fields 5 extend transversally to the longitudinal direction 3 of the band and are provided with hole-type nozzles 6 which are distributed over the field surface area through which gas (e.g. air) is blown against the metal band 1 for forming a gas cushion. Slotted nozzles 8 are provided along the edges 7 of the nozzle fields 5 extending transversally to the longitudinal direction 3 of the band, which slotted nozzles consist of individual nozzle slots 9. Said nozzle slots 9, which are disposed one after the other in a row parallel to the edge, are inwardly inclined (starting out from the respective center of the edge 10) with respect to the edge 7, so that the nozzle slots 9 which are opposite of each other with respect to the nozzle field 5 narrow the nozzle field with respect to the longitudinal edges 11 of the metal band 1. The thus concomitant constriction of the gas cushion as produced through the hole-type nozzles 6 leads to an obstruction in the flowing off of the gas transversally to the longitudinal direction 3 of the band, which has an effect on a respective increase of the static pressure of the gas cushion and thus an increase in the carrying power.

Figure 2:
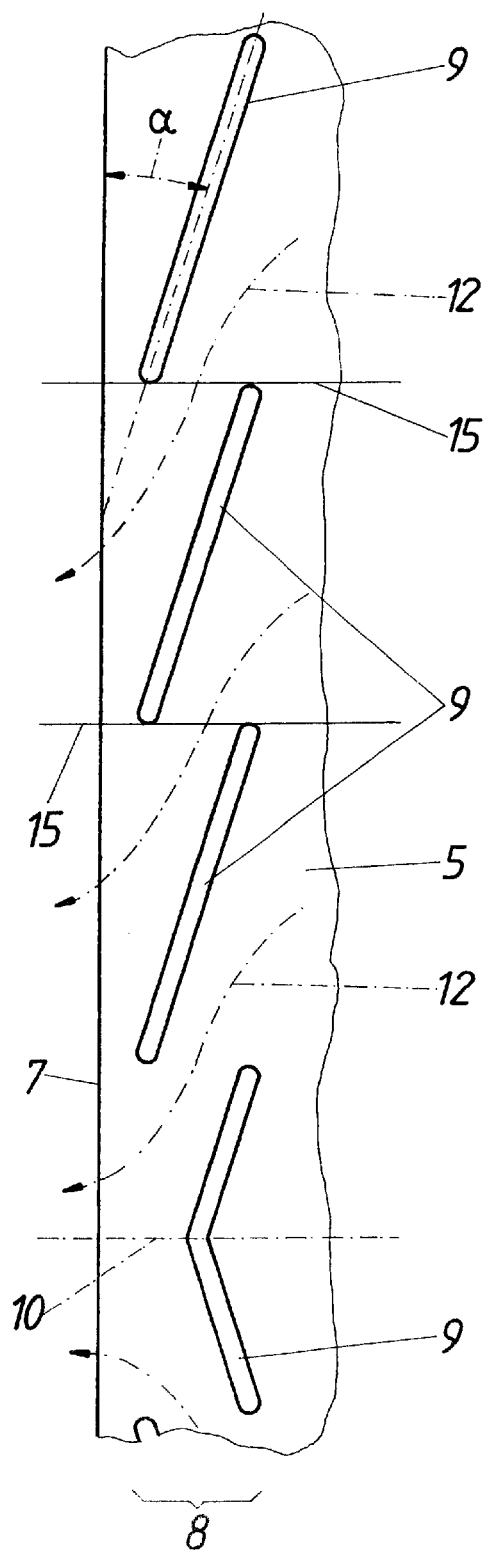
FIG. 2 shows the nozzle slots in accordance with the invention in the edge zone of a nozzle field in a sectional top view on an enlarged scale.
Figure 3:
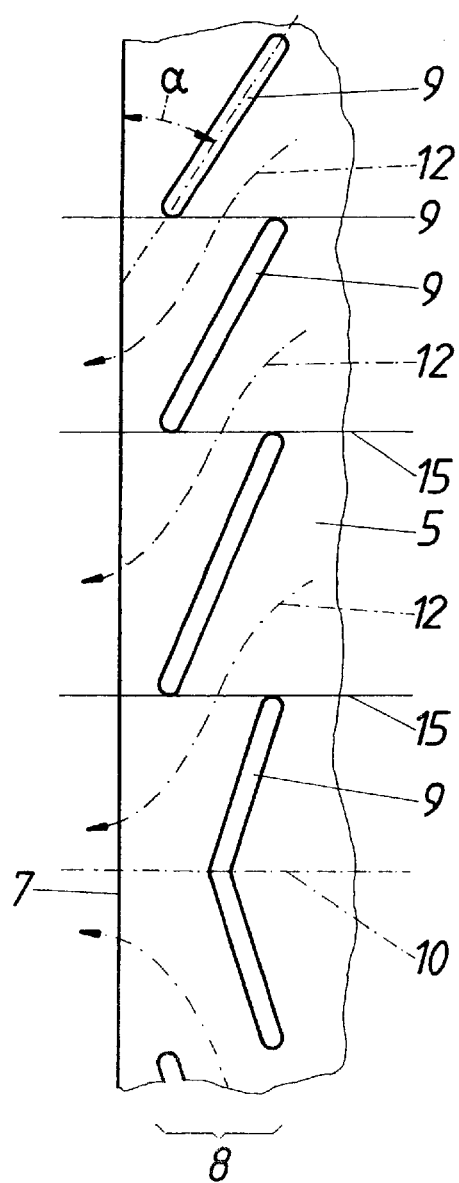
FIG. 3 shows a representation corresponding to FIG. 2 of a constructional variant of the nozzle slots.

At the same time, flow channels for a gas return flow 12 arise between the gas flows by the nozzle slots 9, as is indicated in FIGS. 2 and 3 by the broken lines. Said gas return flow 12 in the longitudinal direction 3 of the band in the zone of the blowing boxes 4 reduces the share in the returning gas flow which is deflected in the zone of the metal band 1 which entails a respective reduction of the flow speed of the reduced gas flow which is deflected on metal band 1. The reduced pressure drop which is connected to the lower flow speed in the zone of the metal band 1 supports the carrying capacity of the apparatus. Despite the additional possibility for the gas to flow off from the gas cushion in the longitudinal direction 3 of the band, the supporting effect of the gas flow through the nozzle slots 9 on the gas cushion of the hole-type nozzles 6 because the gas jets through nozzle slots 9 converge into a closed gas curtain before the metal band 1.

The gas return flows 12 reach the return flow channels 13 which expand from the longitudinal center of the metal band 1 towards the longitudinal edges 11 with respect to the flow cross section by wall surfaces 14 which slope downwardly in a roof-like manner in order to keep the return flow speed in said return flow channels 14 relatively low.

According to the embodiment in accordance with FIG. 2, the longitudinal slots 9 of the slotted nozzles 8 extend parallel with respect to each other, so that the angle of inclination α of said nozzle slots is the same. In order to ensure an even heat treatment of the metal band through the gas flow via the nozzle slots 9, the nozzle slots 9 must not overlap. They therefore end in a zone of a common straight line 15 extending in the longitudinal direction of the band, so that the nozzle slots 9 are situated directly next one another transversally to the longitudinal direction of the band, but mutually offset in the longitudinal direction 3 of the band.

In contrast to the embodiment according to FIG. 2, the nozzle slots 9 according to FIG. 3 are not aligned parallel with respect to each other. The inclination of the nozzle slots 9 increases with growing distance from the center of the edge 10, so that the angle of inclination α increases from nozzle slot to nozzle slot 9, starting out from the center of the edge 10. Said increase of the angle of inclination α produces an increasing constriction of the air cushion produced by the hole-type nozzles 6, which constriction increases towards the longitudinal edges 11 of the metal band 1, which leads to the advantage that the free flowing-off of the gas from the air cushion transversally to the longitudinal direction 3 of the band is increasingly obstructed. This means that the static pressure in the zone of the air cushion and thus the carrying power of the air cushion can be increased.

What is claimed is:

1. An apparatus for guiding a metal band on a gas cushion in a longitudinal direction, the metal band extending in the longitudinal direction and having longitudinal edges, the apparatus comprising blowing boxes disposed one after the other in the longitudinal direction, the blowing boxes having edges extending transversely to the longitudinal direction and
    (a) several rows of hole-shaped nozzles producing nozzle fields extending transversely to the longitudinal direction, the hole-shaped nozzles being distributed over the surface area of the nozzle fields, and
    (b) a row of slotted nozzles extending one after the other along, and parallel to, each edge of the blowing boxes,
        (1) the slotted nozzles being inclined for blowing inwardly with respect to the edges of the blowing boxes, towards a center of the edges of the blowing boxes to form a common nozzle field plane with the hole-shaped nozzles and to narrow the nozzle fields with respect to the longitudinal edges of the metal band.

2. The apparatus of claim 1 wherein the slotted nozzles at respective sides of the center extend parallel to each other.

3. The apparatus of claim 1, wherein the inclination of the slotted nozzles increases with an increasing distance from the center.

4. The apparatus of claim 1, wherein adjacent ones of the slotted nozzles in the rows of slotted nozzles end in an area of a common straight line extending in a direction extending parallel to the longitudinal direction.

* * * * *